United States Patent
Yu et al.

(10) Patent No.: US 8,379,979 B2
(45) Date of Patent: Feb. 19, 2013

(54) SYSTEM AND METHOD FOR EFFECTIVELY PERFORMING A SCENE RECTIFICATION PROCEDURE

(75) Inventors: Liangyin Yu, Fremont, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 12/932,457

(22) Filed: Feb. 25, 2011

(65) Prior Publication Data
US 2012/0219221 A1    Aug. 30, 2012

(51) Int. Cl.
*G06K 9/00* (2006.01)
*G06K 9/34* (2006.01)

(52) U.S. Cl. .................................. 382/173; 382/181

(58) Field of Classification Search ............... 382/143, 382/144, 147, 154, 173, 181, 182, 201–203, 382/229, 254, 260–264, 274, 275, 290, 295, 382/296
See application file for complete search history.

(56) References Cited

U.S. PATENT DOCUMENTS

| | | | |
|---|---|---|---|
| 6,549,660 B1 | 4/2003 | Lipson et al. | |
| 7,738,706 B2 * | 6/2010 | Aradhye et al. | 382/182 |
| 8,045,804 B2 * | 10/2011 | Zeng et al. | 382/188 |
| 8,098,936 B2 * | 1/2012 | Guerzhoy et al. | 382/181 |
| 8,170,368 B2 * | 5/2012 | Yin et al. | 382/276 |
| 2008/0310717 A1 | 12/2008 | Saathoff et al. | |
| 2009/0060352 A1 | 3/2009 | Distante et al. | |
| 2010/0054525 A1 | 3/2010 | Gong et al. | |
| 2012/0219221 A1 * | 8/2012 | Yu et al. | 382/173 |
| 2012/0230592 A1 * | 9/2012 | Iwamura et al. | 382/201 |

OTHER PUBLICATIONS

Sanjiv Kumar, Models for Learning Spatial Interactions in Natural Images for Context-Based Classification, The Robotics Institute, School of Computer Science, Carnegie Mellon University, Pittsburgh, PA, USA, Aug. 2005, http://www.cs.cmu.edu/~skumar/theses.pdf, 1-188 pgs.

Fei Wang, Xin Wang, Tao Li, Efficient Label Propagation for Interactive Image Segmentation, http://www.computer.org/portal/web/csdl/doi/10.1109/ICMLA.2007.54, Dec. 13-15, 2007, IEEE Computer Society, Washington, DC, USA, 1-2 pgs.

Ruth Bergman, Hila Nachlieli, Gitit Ruckenstein, Mark Shaw, Ranjit Bhaskar, Perceptual Segmentation: Combining Image Segmentation With Object Tagging, HP Laboratories, http://www.hpl.hp.com/techreports/2008/HPL-2008-185.pdf, Oct. 6, 2008, 1-14 pgs.

* cited by examiner

*Primary Examiner* — Amir Alavi
(74) *Attorney, Agent, or Firm* — Gregory J. Koerner; Redwood Patent Law

(57) ABSTRACT

A system and method for effectively performing a scene rectification procedure comprises an image manager that includes a segmentation module, a label module, and a rectification module. The segmentation module initially performs a segmentation procedure upon an image to produce corresponding sub-scenes. The label module then categorizes the sub-scenes by assigning initial labels without utilizing context information from other sub-scenes in the image. The rectification module performs a semantic grouping procedure upon the sub-scenes to produce semantic group nodes corresponding to pairs of the sub-scenes that have a predefined semantic relationship. The rectification module converts a sub-scene graph of the sub-scenes into a semantic graph that includes the semantic group nodes. The rectification module then performs a rectification procedure to convert the initial labels of the sub-scenes into rectified labels. A processor of an electronic device typically controls the image manager for performing the scene rectification procedure.

20 Claims, 8 Drawing Sheets

SYSTEM AND METHOD FOR EFFECTIVELY PERFORMING A SCENE RECTIFICATION PROCEDURE

BACKGROUND SECTION

1. Field of the Invention

This invention relates generally to techniques for managing image information, and relates more particularly to a system and method for effectively performing a scene rectification procedure.

2. Description of the Background Art

Implementing effective methods for managing image information is a significant consideration for designers and manufacturers of electronic systems. However, effectively implementing these electronic systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively supports image identification procedures may benefit from an efficient implementation because of the large amount and complexity of the digital data involved.

Due to growing demands on system resources and substantially increasing data magnitudes, it is apparent that developing new techniques for managing image information is a matter of concern for related electronic technologies. Therefore, for all the foregoing reasons, developing effective systems for managing image information remains a significant consideration for designers, manufacturers, and users of contemporary electronic systems.

SUMMARY

In accordance with the present invention, a system and method are disclosed for effectively performing a scene rectification procedure. In accordance with one embodiment of the present invention, a segmentation module of an image manager initially utilizes any effective techniques for performing a segmentation procedure to partition image data into individual segments or sub-scenes. A label module of the image manager may then utilize any effective techniques for performing an initial categorization procedure to generate initial labels that correspond to respective sub-scenes from the image data.

A rectification module of the image manager next performs a semantic grouping procedure upon the sub-scenes according to any appropriate grouping criteria. For example, in certain embodiments, the grouping criteria may include, but are not limited to, adjacency characteristics of the various sub-scenes. The rectification module also converts a sub-scene adjacency graph into a semantic graph to thereby identify all semantic relationships between respective pairs of the sub-scenes.

Finally, the rectification module performs a rectification procedure upon the initial labels of the adjacent sub-scene pairs identified in the semantic graph to thereby generate final rectified labels for the sub-scenes. The present invention thus provides an original method for detecting errors in object recognition within an image by utilizing spatial relationships between objects and their neighbors after image segmentation.

In practice, if there are errors in assigning labels to regions in a segmented image, the mistake may be discovered by analyzing the spatial relationships between a region and its neighbor regions. Expanding this relationship to the whole image and designing proper error functions using matching learning methods, unstable (and hence erroneous) label assignments can be detected and subsequently corrected. By applying optimization methods using linear functions or Bayesian inference, the present invention sets up a global error rectification function to detect errors in recognizing regions of the segmented image.

The present invention may be applied in general to any applications involving intelligent interpretation of image contents. It can also be of great help in re-segmenting the image once correct regions have been recognized. The present invention therefore provides an efficient algorithm involving: 1). segmentation, 2). intelligent region label assignment, and 3). an optimization process to detect labeling errors and restore correct labeling. For all of the foregoing reasons, the present invention therefore provides an improved system and method for effectively performing a scene rectification procedure.

DETAILED DESCRIPTION

The present invention relates to an improvement in image identification systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing a scene rectification procedure, and may comprise an image manager that includes a segmentation module, a label module, and a rectification module. The segmentation module initially performs a segmentation procedure upon an image to produce corresponding sub-scenes. The label module then categorizes the sub-scenes by assigning initial labels without utilizing context information from other sub-scenes in the image. The rectification module performs a semantic grouping procedure upon the sub-scenes to produce semantic group nodes corresponding to pairs of the sub-scenes that have a predefined semantic relationship. The rectification module converts a sub-scene graph of the sub-scenes into a semantic graph that includes the semantic group nodes. The rectification module then performs a rectification procedure to convert the initial labels of the sub-scenes into rectified labels. A processor of an electronic device typically controls the image manager for performing the scene rectification procedure.

Figure 1:
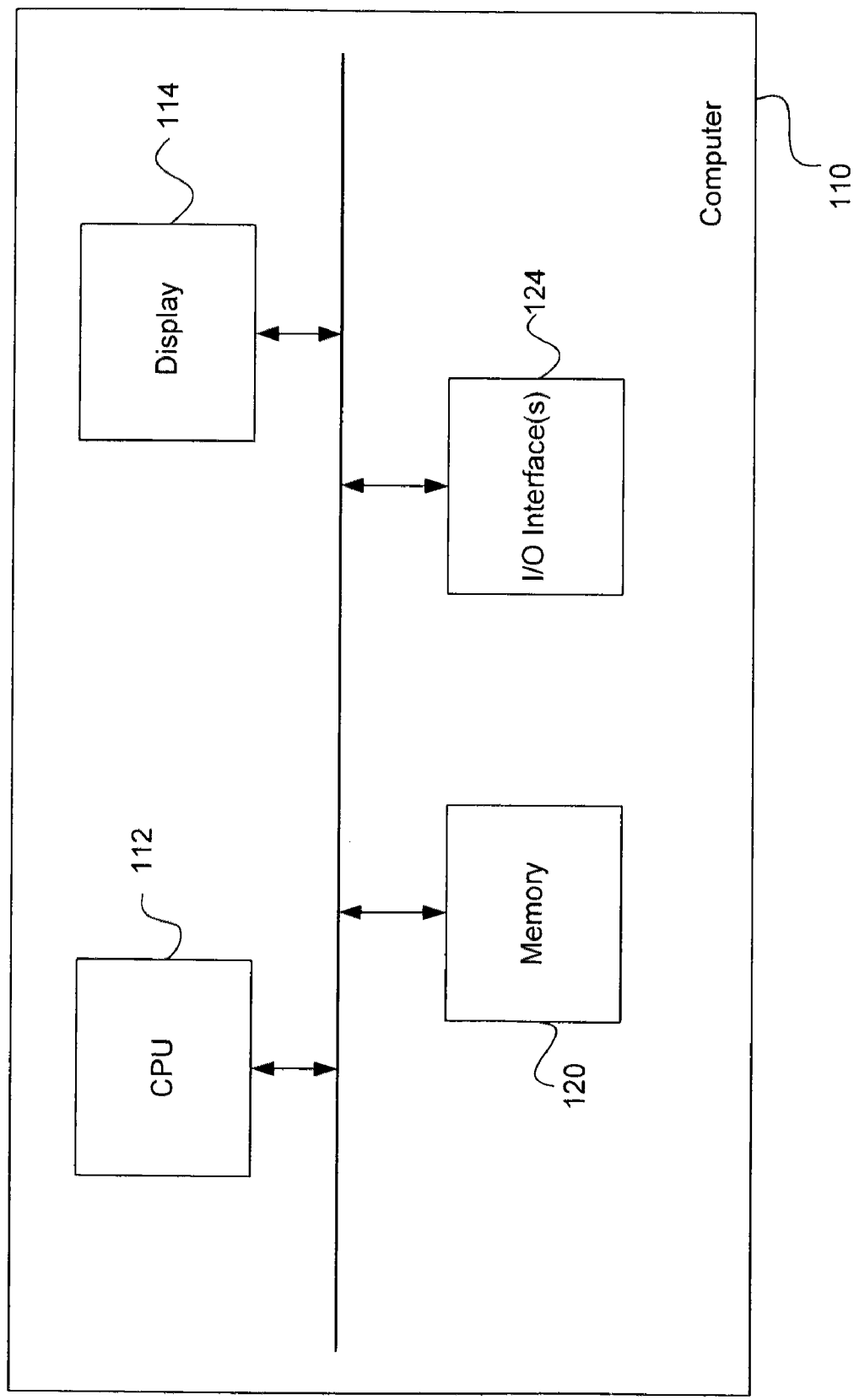
FIG. 1 is a block diagram for one embodiment of a computer, in accordance with the present invention.

Referring now to FIG. 1, a block diagram for one embodiment of a computer 110 is shown, in accordance with the present invention. In the FIG. 1 embodiment, computer 110 may include, but is not limited to, a central processing unit (CPU) 112, a display 114, a memory 120, and one or more input/output interfaces (I/O interfaces) 124. In alternate embodiments, computer 110 may be implemented using various components and configurations in addition to, or instead of, those certain of those components and configurations discussed in conjunction with the FIG. 1 embodiment. In addition, computer 110 may alternately be implemented as any other desired type of electronic device or entity.

In the FIG. 1 embodiment, CPU 112 may be implemented to include any appropriate and compatible microprocessor device that preferably executes software instructions to thereby control and manage the operation of computer 110. The FIG. 1 display 114 may include any effective type of display technology including a cathode-ray-tube monitor or a liquid-crystal display device with an appropriate screen for displaying various information to a device user.

In the FIG. 1 embodiment, memory 120 may be implemented to include any combination of desired storage devices, including, but not limited to, read-only memory (ROM), random-access memory (RAM), and various types of non-volatile memory, such as floppy disks or hard disks. The contents and functionality of memory 120 are further discussed below in conjunction with FIG. 2.

In the FIG. 1 embodiment, I/O interfaces 124 may include one or more input and/or output interfaces to receive and/or transmit any required types of information for computer 110. For example, in the FIG. 1 embodiment, computer 110 may utilize I/O interfaces 124 to communicate with various external entities. In addition, a system user may utilize I/O interfaces 124 to communicate with computer 110 by utilizing any appropriate and effective techniques. The implementation and utilization of the FIG. 1 computer 110 is further discussed below in conjunction with FIGS. 2-7.

Figure 2:
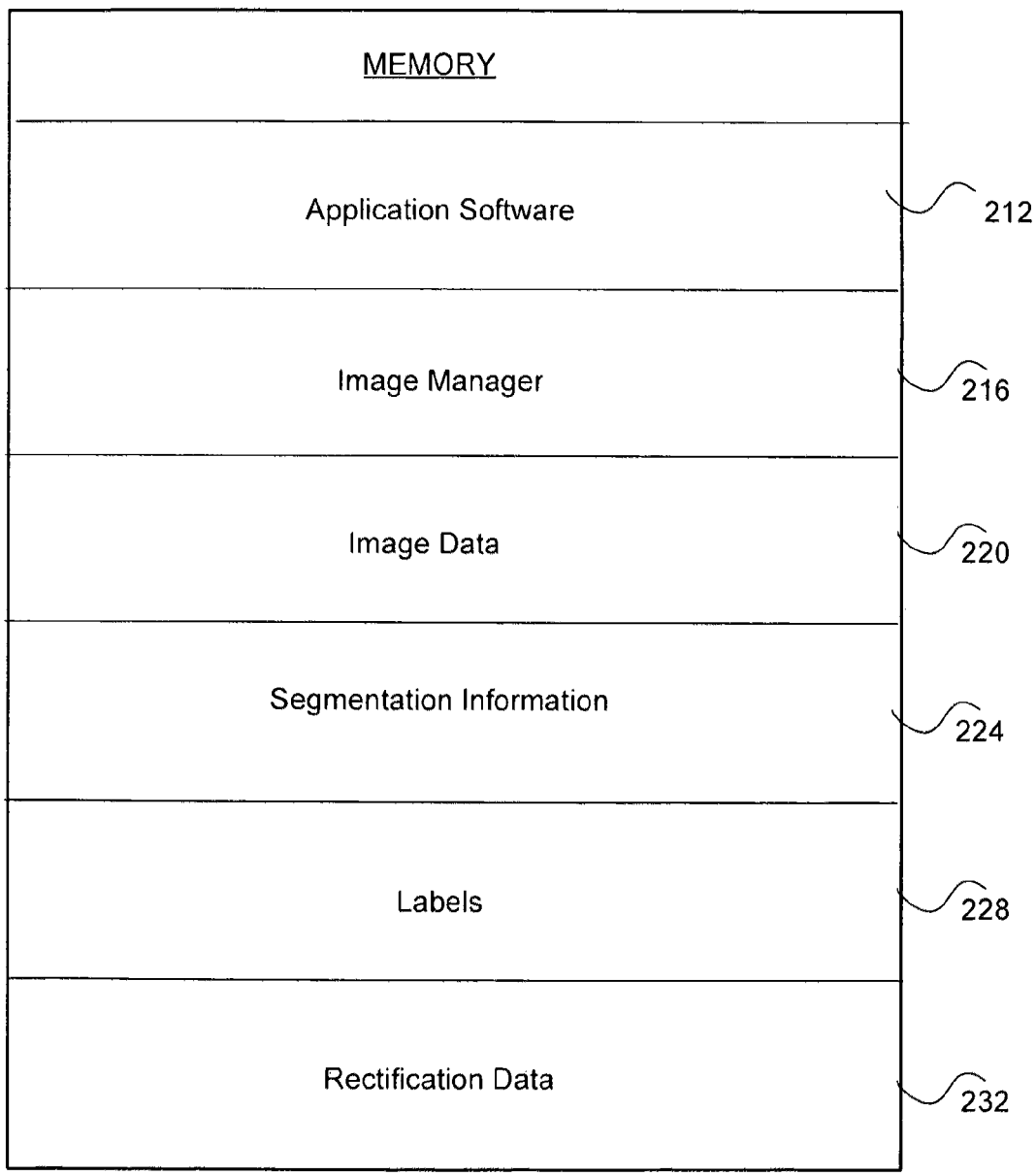
FIG. 2 is a block diagram for one embodiment of the memory of FIG. 1, in accordance with the present invention.

Referring now to FIG. 2, a block diagram for one embodiment of the FIG. 1 memory 120 is shown, in accordance with the present invention. In the FIG. 2 embodiment, memory 120 includes, but is not limited to, application software 212, an image manager 216, image data 220, segmentation information 224, labels 228, and rectification data 232. In alternate embodiments, memory 120 may include various other components and functionalities in addition to, or instead of, certain those components and functionalities discussed in conjunction with the FIG. 2 embodiment.

In the FIG. 2 embodiment, application software 212 may include program instructions that are preferably executed by CPU 112 (FIG. 1) to perform various functions and operations for computer 110. The particular nature and functionality of application software 212 preferably varies depending upon factors such as the specific type and particular functionality of the corresponding computer 110.

In the FIG. 2 embodiment, image manager 216 may effectively perform various scene rectification procedures upon image data 220 in accordance with the present invention. In the FIG. 2 embodiment, segmentation information 224 may include any appropriate information for partitioning image data 220 into individual segments or sub-scenes. In the FIG. 2 embodiment, labels 228 may include categorization identifiers that correspond to respective ones of the sub-scenes from image data 220. In the FIG. 2 embodiment, rectification data 232 may include any appropriate information for performing scene rectification procedures in accordance with the present invention. Further details for performing scene rectification procedures are discussed below in conjunction with FIGS. 3-7.

In the FIG. 2 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. The implementation and utilization of image manager 216 are further discussed below in conjunction with FIGS. 3 through 7.

Figure 3:
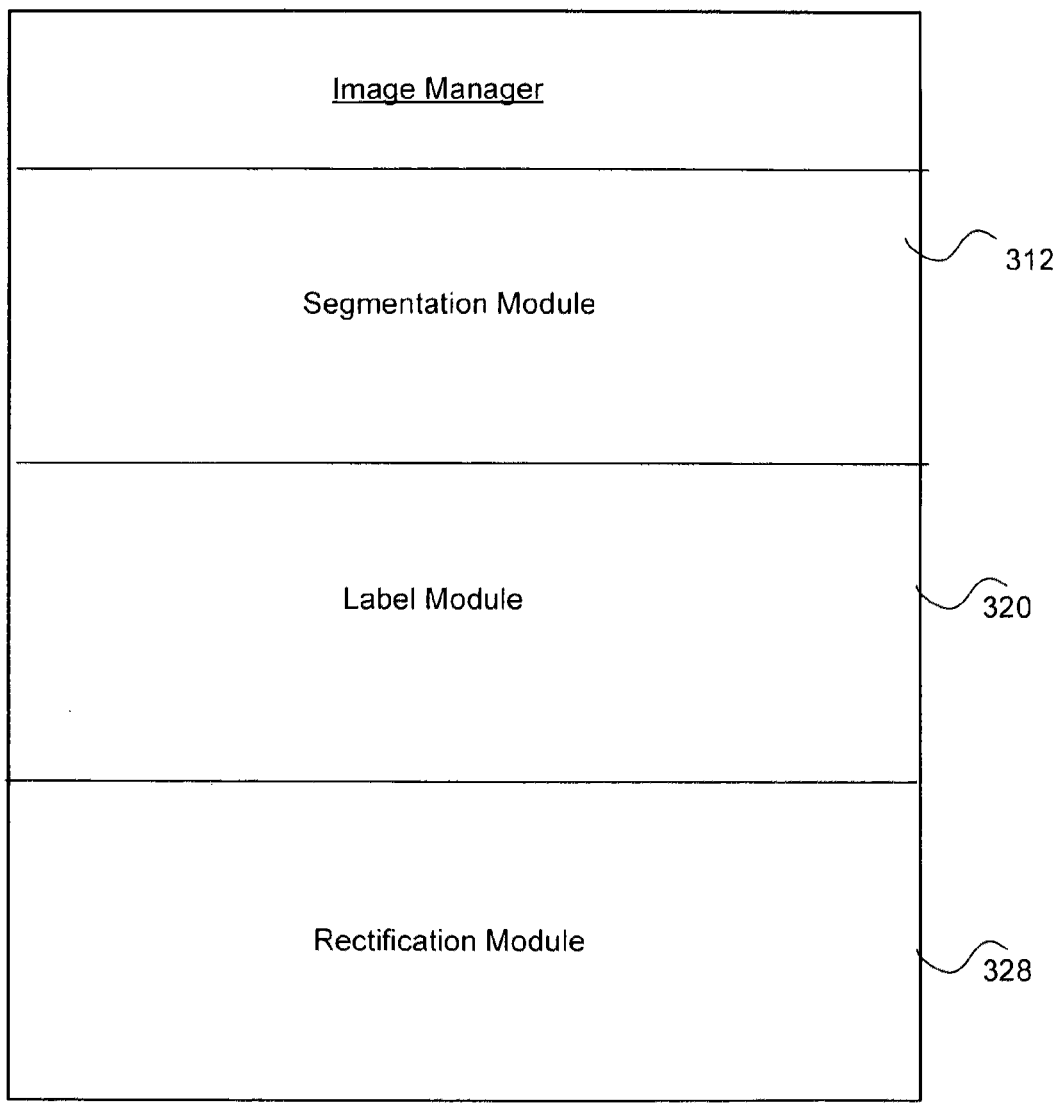
FIG. 3 is a block diagram for one embodiment of the image manager of FIG. 2, in accordance with the present invention.

Referring now to FIG. 3, a block diagram for one embodiment of the FIG. 2 image manager 216 is shown, in accordance with the present invention. In the FIG. 3 embodiment, image manager 216 includes, but is not limited to, a segmentation module 312, a label module 320, and a rectification module 328. In alternate embodiments, image manager 216 may include various other components and functionalities in addition to, or instead of, certain those components and functionalities discussed in conjunction with the FIG. 3 embodiment.

In the FIG. 3 embodiment, segmentation module 312 may utilize any effective techniques for performing a segmentation procedure to partition image data 220 into individual segments or sub-scenes. In the FIG. 3 embodiment, label module 320 may utilize any effective techniques for performing an initial categorization procedure to generate initial labels that correspond to respective ones of the sub-scenes from image data 220 (FIG. 2). In certain embodiments, label module 320 may create a ranked list of label candidates for each sub-scene with the most likely candidate being assigned as the initial label. In the FIG. 3 embodiment, rectification module 328 may utilize any effective techniques for performing scene rectification procedures to rectify any incorrect initial labels, in accordance with the present invention. The implementation and utilization of image manager 216 are further discussed below in conjunction with FIGS. 4 through 7.

Figure 4:
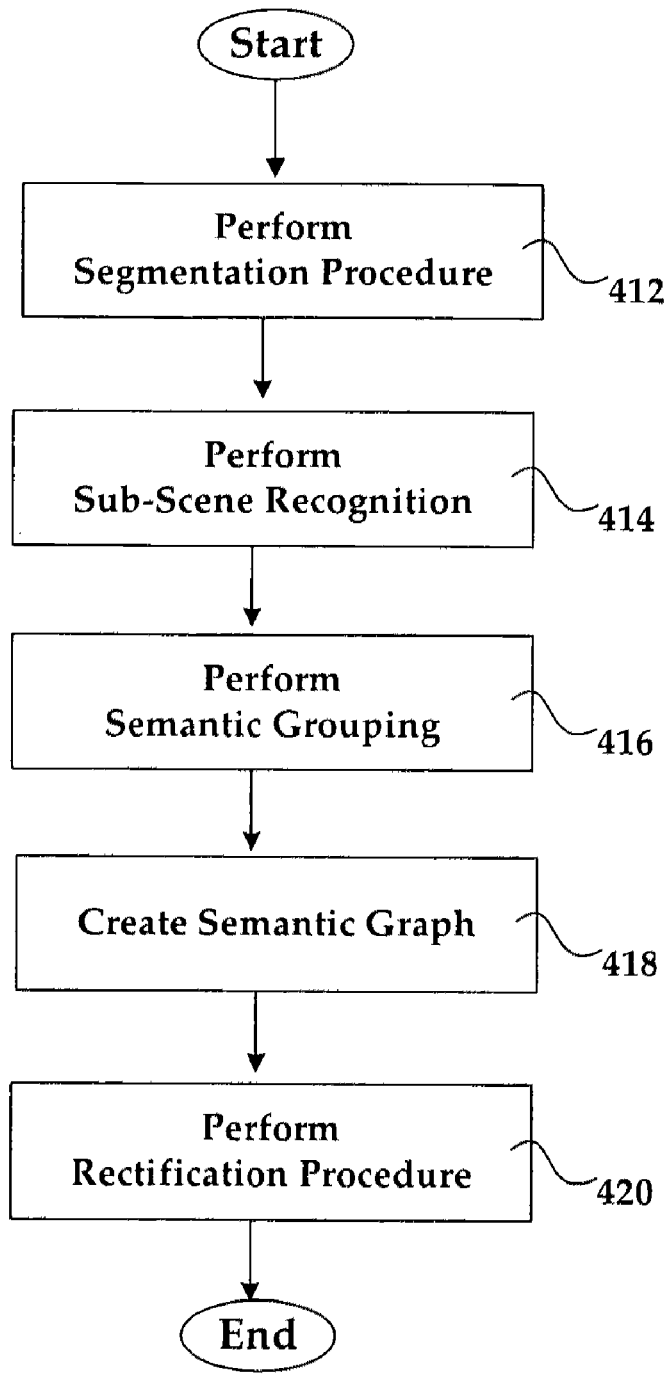
FIG. 4 is a flowchart of method steps for performing a scene rectification procedure, in accordance with one embodiment of the present invention.

Referring now to FIG. 4, a flowchart of method steps for performing a scene rectification procedure is shown, in accordance with one embodiment of the present invention. The FIG. 4 example is presented for purposes of illustration, and in alternate embodiments, the present invention may readily utilize various steps and sequences other than those discussed in conjunction with the FIG. 4 embodiment.

In the FIG. 4 embodiment, in step 412, a segmentation module 312 of an image manager 216 initially utilizes any effective techniques for performing a segmentation procedure to partition image data 220 into individual segments or sub-scenes. In step 414, a label module 320 of the image manager 216 may then utilize any appropriate techniques for performing an initial categorization procedure to generate initial labels that correspond to respective sub-scenes from the image data 220.

In step 416, a rectification module 328 of the image manager 216 performs a semantic grouping procedure upon the sub-scenes according to any appropriate grouping criteria. For example, in certain embodiments, the grouping criteria may include, but are not limited to, adjacency characteristics of the sub-scenes. In step 418, the rectification module 328 converts a sub-scene adjacency graph into a semantic graph to thereby identify all semantic relationships for pairs of the sub-scenes.

Finally, in step 420, the rectification module 328 performs a rectification procedure upon the initial labels of the sub-scenes identified in the semantic graph to thereby generate final rectified labels for the sub-scenes. The FIG. 4 process may then terminate. The present invention thus provides an original method for detecting errors in object recognition within an image using spatial relationships between objects and their neighbors after image segmentation.

As shown above, in image understanding and scene classification, it is often necessary to recognize regions/sub-scenes in a segmented image and assign them to a set of pre-defined labels. These labels are subsequently used in applications for intelligent processing of the image. The present invention therefore provides an algorithm to address the issue of inevitable errors that are made in labeling each region with correct labels.

If there are errors in assigning labels to regions in a segmented image, the mistake can be discovered by analyzing the spatial relationships between a region and its neighbor regions. Expanding this relationship to the whole image and designing proper error functions using matching learning methods, unstable (and hence erroneous) label assignments can be detected and subsequently corrected. By applying optimization methods using linear functions or Bayesian inference, the present invention sets up a global error rectification function to detect errors in labeling the various regions of the segmented image.

This novel algorithm can be applied in general to any applications involving intelligent interpretation of image contents. It can also be of great help in re-segmenting the image once correct regions have been labeled. The present invention therefore provides an efficient algorithm involving: 1). segmentation, 2). intelligent region label assignment, and 3). an optimization process to detect labeling errors and restore correct labeling. For all of the foregoing reasons, the present invention therefore provides an improved system and method for effectively performing a scene rectification procedure.

Figure 5:
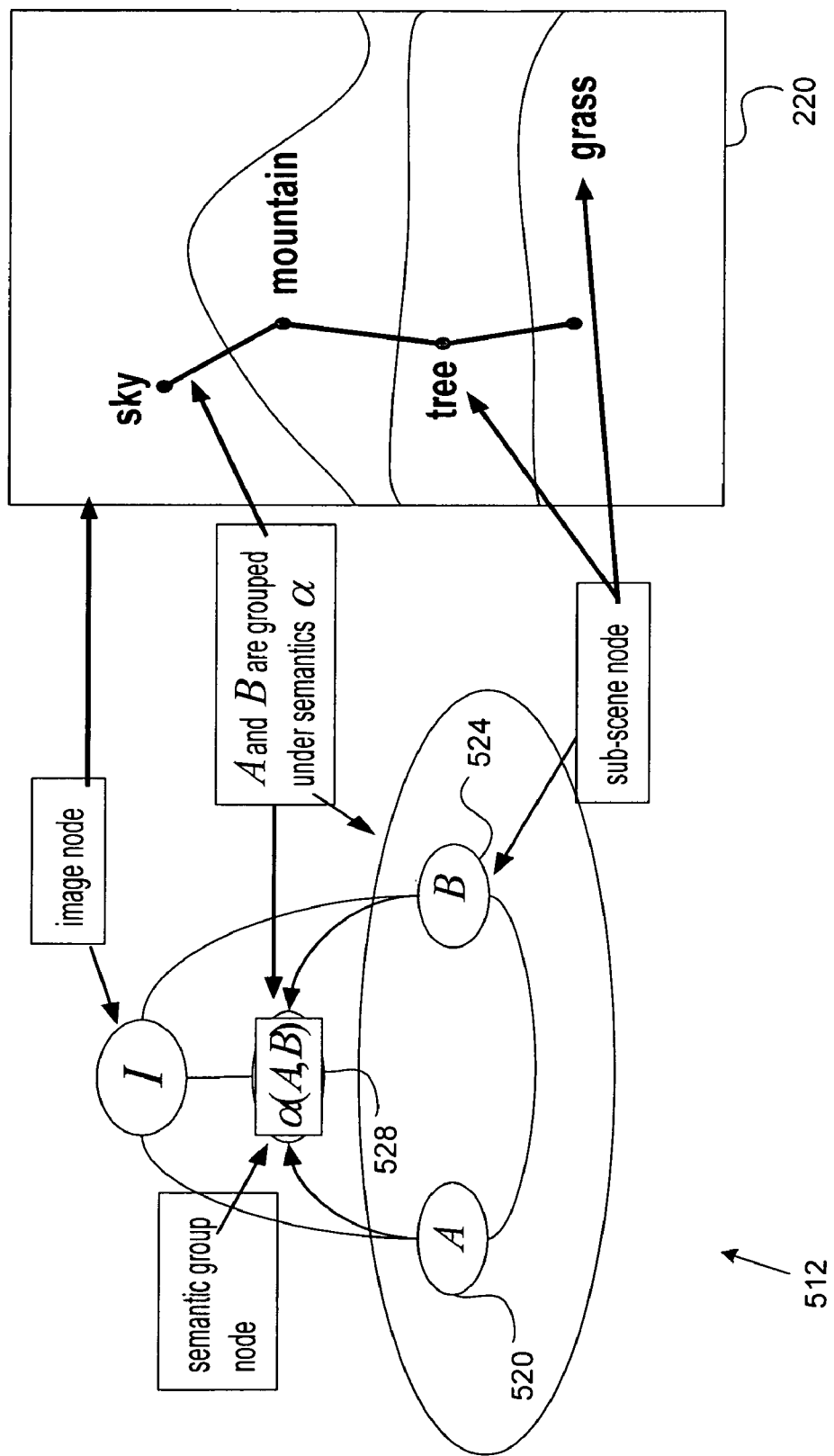
FIG. 5 is a diagram illustrating a semantic grouping procedure, in accordance with one embodiment of the present invention.

Referring now to FIG. 5, a diagram illustrating a semantic grouping procedure is shown, in accordance with one embodiment of the present invention. The FIG. 5 embodiment is presented for purposes of illustration, and in alternate embodiments, semantic procedures may be performed using steps and functionalities in addition to, or instead of, certain of those steps and functionalities discussed in conjunction with the FIG. 5 embodiment.

In the FIG. 5 embodiment, an image 220 of a natural setting is shown for purposes of illustrating the results of a segmentation procedure, a labeling procedure, and a semantic grouping procedure. However, any other image or photographic target is equally contemplated by the present invention. In the FIG. 5 embodiment, image manager 216 (FIG. 3) has divided image 220 into four regions or sub-scenes that are each represented by a corresponding sub-scene node. In particular, image 220 has been segmented into a sky region, a mountain region, a tree region, and a grass region that each have a respective corresponding label (e.g., sky, mountain, tree, grass).

In the FIG. 5 embodiment, image manager 216 has grouped pairs of the sub-scenes into semantic groups based upon their relative spatial adjacency, and each pair of the semantic groups is connected by a line referred to as an "edge" that represents their semantic adjacency relationship. For example, sky is linked to mountain, mountain is linked to tree, and tree is linked to grass. Image manager 216 may utilize any appropriate criteria to define whether two sub-scenes are considered to be adjacent.

As depicted in graph 512 of the FIG. 5 embodiment, image manager 216 may create a semantic group node 528 to represent the semantic grouping of two sub-scenes. In the FIG. 5 example, a sub-scene A 520 is grouped with a sub-scene B 524 to produce a semantic group node 518 that is represented as "$\alpha(A,B)$" with alpha representing the particular semantic relationship. In accordance with the present invention, image manager 216 may create semantic group nodes 528 for each pair of sub-scenes that satisfy the semantics definition criteria.

Although the FIG. 5 embodiment utilizes spatial adjacency in image 220 to define semantic group nodes 528, image manager 216 may utilize any effective semantic grouping criteria. For example, image manager 216 may consider class dependency of the sub-scenes (whether the sub-scenes belong to the same class). Image manager 216 may also consider semantic co-occurrence of the sub-scenes (whether the sub-scenes are related by context such as a whole-part relationship). Additional details and techniques for performing scene rectification procedures are further discussed below in conjunction with FIGS. 6 and 7.

Figure 6A:
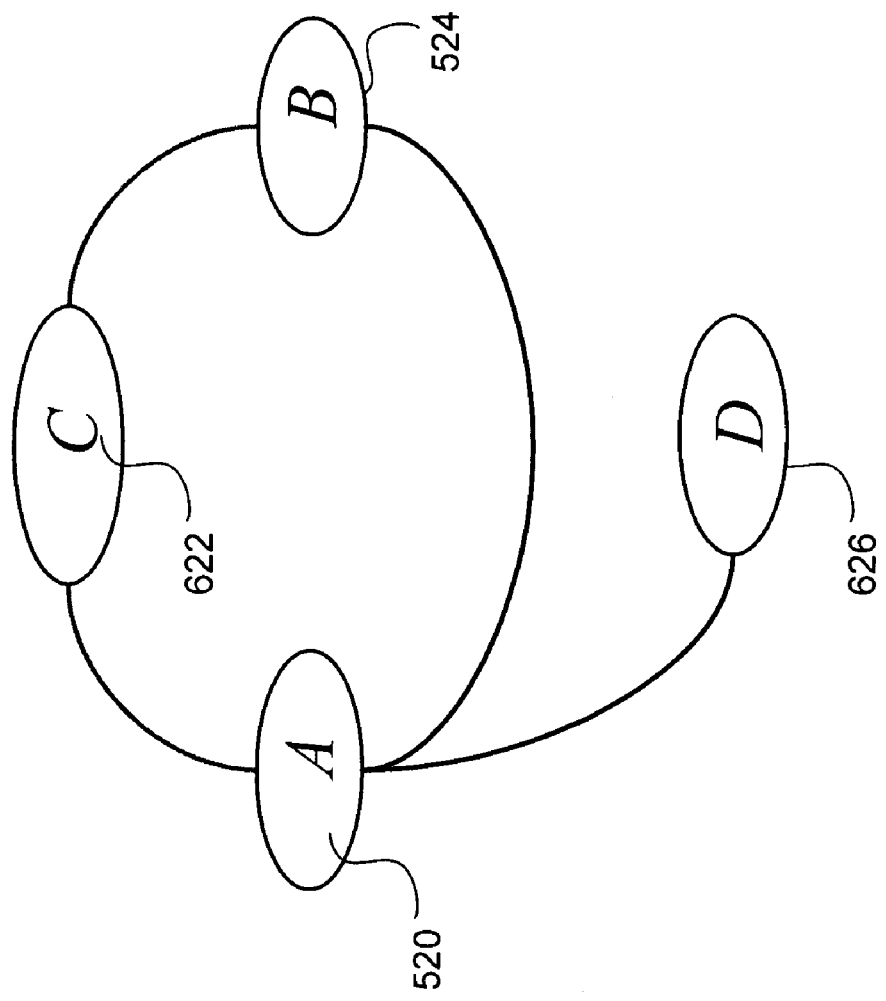
FIGS. 6A and 6B are diagrams illustrating a semantic graph creation procedure, in accordance with one embodiment of the present invention.
Figure 6B:
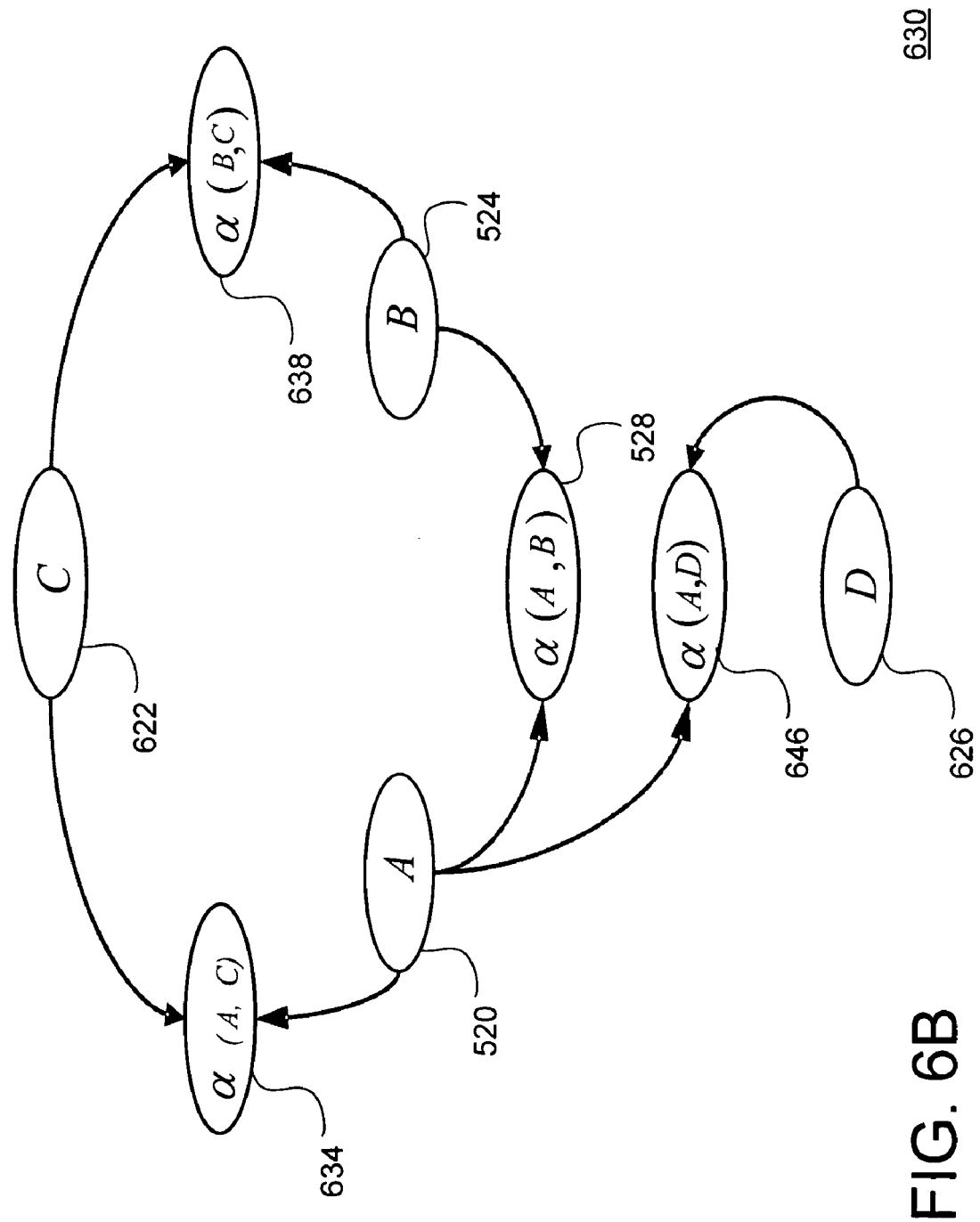

Referring now to FIGS. 6A and 6B, diagrams illustrating a semantic graph creation procedure are shown, in accordance with one embodiment of the present invention. The FIG. 6 embodiment is presented for purposes of illustration, and in alternate embodiments, semantic graph creation procedures may be performed using steps and functionalities in addition to, or instead of, certain of those steps and functionalities discussed in conjunction with the FIG. 6 embodiment.

In the FIG. 6A embodiment, image manager 216 initially creates a sub-scene adjacency graph 612 to represent the different sub-scenes identified in an image 220. In the FIG. 5 embodiment, each sub-scene is connected by a line/edge to any other sub-scene(s) that are adjacent. For purposes of illustration, sub-scene A 520 is adjacent to sub-scene B 524, sub-scene C 622, and sub-scene D 626, while sub-scene B 524 is also adjacent to sub-scene C 622.

In the FIG. 6B embodiment, image manager 216 has converted the sub-scene adjacency graph 612 of FIG. 6A into a semantic graph 630 by transforming pairwise edges between adjacent sub-scenes in the adjacency graph 612 into directional dependency edges that each include a semantic group node defining the semantic relationship between a corresponding pair of adjacent sub-scenes. For example, in the FIG. 6B example, image manager 216 has created a semantic group node 528 between sub-scene A 520 and sub-scene B 524, and has also created a semantic group node 634 between sub-scene A 520 and sub-scene C 622. Similarly, image manager 216 has created a semantic group node 646 between sub-scene A 520 and sub-scene D 626, and has also created a semantic group node 638 between sub-scene B 524 and sub-scene C 622. The present invention may then perform appropriate scene rectification procedures upon labels of the sub-scenes by referring to the semantic group nodes defined in FIG. 6B. Additional details and techniques for performing scene rectification procedures are further discussed below in conjunction with FIG. 7.

Figure 7:
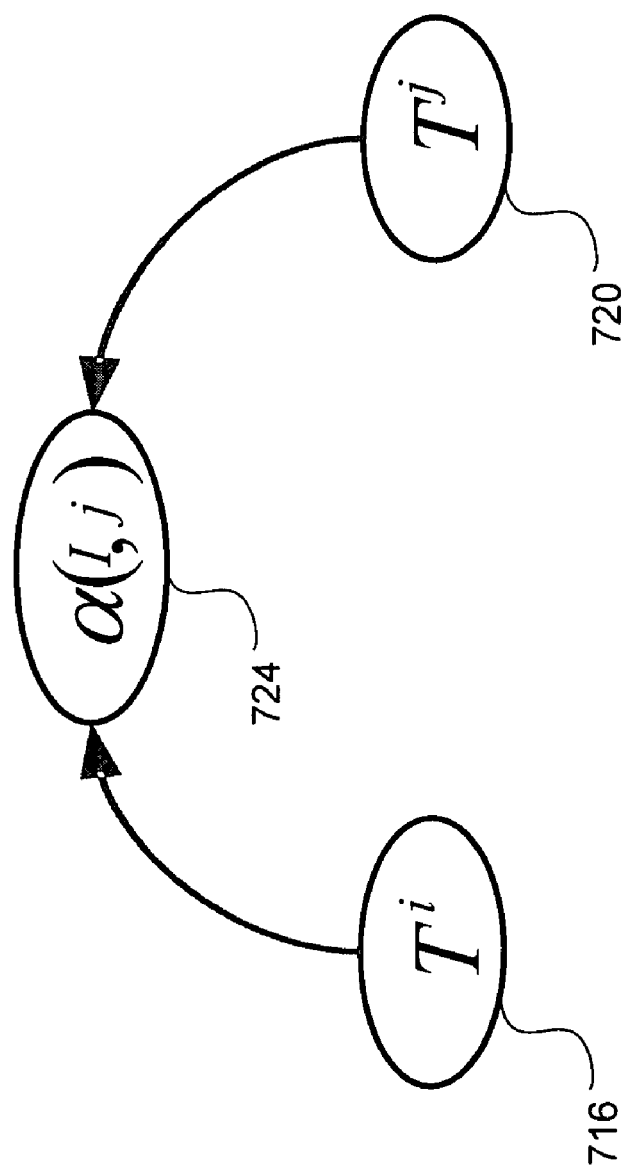
FIG. 7 is a diagram illustrating a scene rectification procedure, in accordance with one embodiment of the present invention.

Referring now to FIG. 7, a label pair diagram 712 for illustrating a scene rectification procedure is shown, in accordance with one embodiment of the present invention. The FIG. 7 embodiment is presented for purposes of illustration, and in alternate embodiments, scene rectification procedures may be performed using steps and functionalities in addition to, or instead of, certain of those steps and functionalities discussed in conjunction with the FIG. 7 embodiment.

In the FIG. 7 label pair diagram 712, the labels $T^i$ 716 and $T^j$ 720 are shown connected by a semantic group node $\alpha(i,j)$ 724. In the FIG. 7 label pair diagram 712, label $T^i$ 716 represents a first label at an index "i" corresponding to a first sub-scene. In the FIG. 7 label pair diagram 712, label $T^j$ 720 represents a second label at an index "j" corresponding to a second sub-scene. In the FIG. 7 label pair diagram 712, semantic group node $\alpha(i,j)$ 724 indicates that labels $T^i$ 716 and $T^j$ 720 are related by at least one predefined semantic characteristic (such as adjacency). In certain embodiments, semantic group node $\alpha(i,j)$ 724 may be derived from semantic group nodes of the semantic graph 630 of FIG. 6B. Therefore, image manager 216 may derive similar label pair diagrams 712 for labels corresponding to each of the semantic group nodes from FIG. 6B.

The present invention may perform scene rectification procedures to produce rectified labels according to any effective techniques. In the FIG. 7 embodiment, image manager 216 utilizes Bayesian techniques and theories in a Bayesian framework to perform scene rectification. Therefore, Bayesian terminology and methods will be utilized to describe scene rectification in the formulas and functions presented below.

In general, the Bayesian framework provides a probabilistic way to evaluate statistical data. Additional information regarding Bayesian techniques, terminology, and theory may be found in "Probabilistic Reasoning In Intelligent Systems: Networks Of Plausible Inference," J. Pearl, Chapter 2, Morgan Kaufmann, 1988, which is hereby incorporated by reference.

The discussion below refers to various probability values "P" that may be obtained or derived in any appropriate manner. For example, in certain embodiments, probability values may be derived by image manager 216, or other appropriate entity, by performing machine learning analysis procedures upon a large image database to observe statistical probabilities of various sub-scenes, labels, segmentations, and other image characteristics or combinations.

In the FIG. 7 embodiment, in accordance with the Bayesian framework, a prior is independent, and may be expressed by the following equation.

$$P(T^i, T^j) = P(T^i)P(T^j)$$

where $T^i$ and $T^j$ are labels for adjacent sub-scenes as shown in the FIG. 7 label pair diagram 712, and P represents corresponding probability values, as discussed above.

Therefore, in the FIG. 7 embodiment, the semantic likelihood for the label pair diagram 712 of one pair of labels $T^i$ and $T^j$ is a joint distribution that may be expressed by the following belief network equation.

$$P(\alpha(i,j), T^i, T^j) = P(T^i)P(T^j)P(\alpha(i,j)|T^i, T^j)$$

where $T^i$ and $T^j$ are labels for adjacent sub-scenes as shown in the FIG. 7 label pair diagram 712, $\alpha(i,j)$ is the semantic group node shown in the FIG. 7 label pair diagram 712, and P represents various respective probability values, as discussed above.

In order to perform scene rectification procedures for an entire image 220 as represented in the semantic graph 630 of FIG. 6B, image manager 216 may apply the foregoing belief network equation to labels from all semantic group nodes from the image 220 to provide a global joint distribution function. A global joint distribution function that provides the most likely label assignment may be expressed by the following function.

$$(T^1, \ldots, T^N) = \mathrm{argmax} \prod_\alpha P(\alpha(i,j), T^i, T^j)$$

$$= \mathrm{argmax} \prod_\alpha P(T^i)P(T^j)P(\alpha(i,j)|T^i, T^j)$$

where $T^i, \ldots, T^N$ represent all of the rectified most-likely labels for an image 220, $\Pi$ indicates that the individual belief network functions (discussed above) for all label pairs are multiplied, $T^i$ and $T^j$ are labels for adjacent sub-scenes as shown in the FIG. 7 label pair diagram 712, $\alpha(i,j)$ is the semantic group node shown in the FIG. 7 label pair diagram 712, and P represents various respective probability values, as discussed above.

In the FIG. 7 embodiment, "arg max" indicates that the particular labels $T^i, \ldots, T^N$ that produce the greatest function result, when their probabilities are utilized in the global joint distribution function, are the correct final rectified labels. In the FIG. 7 embodiment, according to Bayesian terminology, the vertical line occurring just before the values "$T^i$, Tj" at the end of the global joint distribution function indicates that this is a conditional probability function in which labels $T^i$ and $T^j$ are known entities.

In accordance with one embodiment of the present invention, image manager 216 may utilize an extended context-sensitive prior that specifies a context $\tilde{C}$ for the foregoing global joint distribution function. In that case, a context-sensitive prior may be expressed by the following equation.

$$P(T^i, T^j|\tilde{C}) = P(T^i|\tilde{C})P(T^j|\tilde{C})$$

where $\tilde{C}$ is a particular context (such as nature, ocean, city, etc.).

Therefore, the foregoing global joint distribution function may be modified into a context-sensitive global joint distribution function that may be expressed by the following function.

$$\prod_\alpha P(\alpha(i,j), T^i, T^j | \tilde{C}) = \prod_\alpha P(T^i | \tilde{C})P(T^j | \tilde{C})P(\alpha(i,j)|T^i, T^j, \tilde{C})$$

In accordance with the present invention, the context-sensitive global joint distribution function therefore incorporates a particular defined context as an additional conditional probability value. For all of the foregoing reasons, the present invention thus provides an improved system and method for effectively performing a scene rectification procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image recognition procedure, comprising:

an image manager with a rectification module that performs a semantic grouping procedure upon sub-scenes of an image to produce semantic group nodes corresponding to pairs of said sub-scenes that have a semantic relationship, said rectification module converting a sub-scene graph of said sub-scenes into a semantic graph that includes said semantic group nodes, said rectification module performing a rectification procedure to convert initial labels of said sub-scenes into rectified labels; and a processor of an electronic device that controls said image manager to perform said image recognition procedure.

2. The system of claim 1 wherein said image manager analyzes said rectified labels to perform said image recognition procedure on said image.

3. The system of claim 1 wherein a segmentation module of said image manager initially performs a segmentation procedure upon said image to produce said sub-scenes.

4. The system of claim 3 wherein said segmentation module identifies sub-scene nodes corresponding to locations of said sub-scenes in said image.

5. The system of claim 3 wherein a label module of said image manager performs a labeling procedure upon said sub-scenes to produce said initial labels.

6. The system of claim 5 wherein said rectification module creates said semantic group nodes for said pairs of sub-scenes by utilizing predefined grouping criteria.

7. The system of claim 6 wherein said predefined grouping criteria include adjacency characteristics of said pairs of sub-scenes.

8. The system of claim 6 wherein said predefined grouping criteria include class dependency characteristics of said pairs of sub-scenes.

9. The system of claim 6 wherein said predefined grouping criteria include semantic co-occurrence characteristics of said pairs of sub-scenes.

10. The system of claim 6 wherein said rectification module creates said sub-scene graph as a sub-scene adjacency graph that connects said pairs of sub-scenes that have predefined adjacency characteristics.

11. The system of claim 10 wherein said rectification module creates said semantic graph to include sub-scene nodes and semantic group nodes for each of said pairs of sub-scenes.

12. The system of claim 10 wherein said rectification module performs said rectification procedure by utilizing linear optimization techniques.

13. The system of claim 10 wherein said rectification module performs said rectification procedure by utilizing a Bayesian framework.

14. The system of claim 13 wherein said Bayesian framework includes probability values for said rectified labels of said pairs of sub-scenes and a corresponding one of said semantic group nodes from said semantic graph.

15. The system of claim 14 wherein said probability values are derived by performing a machine learning procedure upon images in an image database.

16. The system of claim 14 wherein said rectification module calculates a belief network function for one of said pairs of said sub-scenes by multiplying probability values for said rectified labels of one of said pairs of sub-scenes and a corresponding one of said semantic group nodes.

17. The system of claim 16 wherein said rectification module calculates a global belief function for all of said pairs of said sub-scenes by multiplying all of said belief network functions, a maximum value of said global belief function indicating said rectified labels.

18. The system of claim 17 wherein said rectification module calculates said global belief function as a context-sensitive global belief function by also including a context condition.

19. The system of claim 3 wherein said label module identifies said initial labels without utilizing context information from other sub-scenes in said image.

20. A method for performing an image recognition procedure with an image manager, comprising the steps of:

performing a semantic grouping procedure upon sub-scenes of an image to produce semantic group nodes corresponding to pairs of said sub-scenes that have a semantic relationship;

converting a sub-scene graph of said sub-scenes into a semantic graph that includes said semantic group nodes;

performing a rectification procedure to convert initial labels of said sub-scenes into rectified labels; and controlling said image manager with a processor of an electronic device to perform said image recognition procedure.

* * * * *